April 25, 1939.   R. M. MacCORMAC   2,155,432
ROTARY CONCENTRATOR
Filed June 24, 1935   3 Sheets-Sheet 3

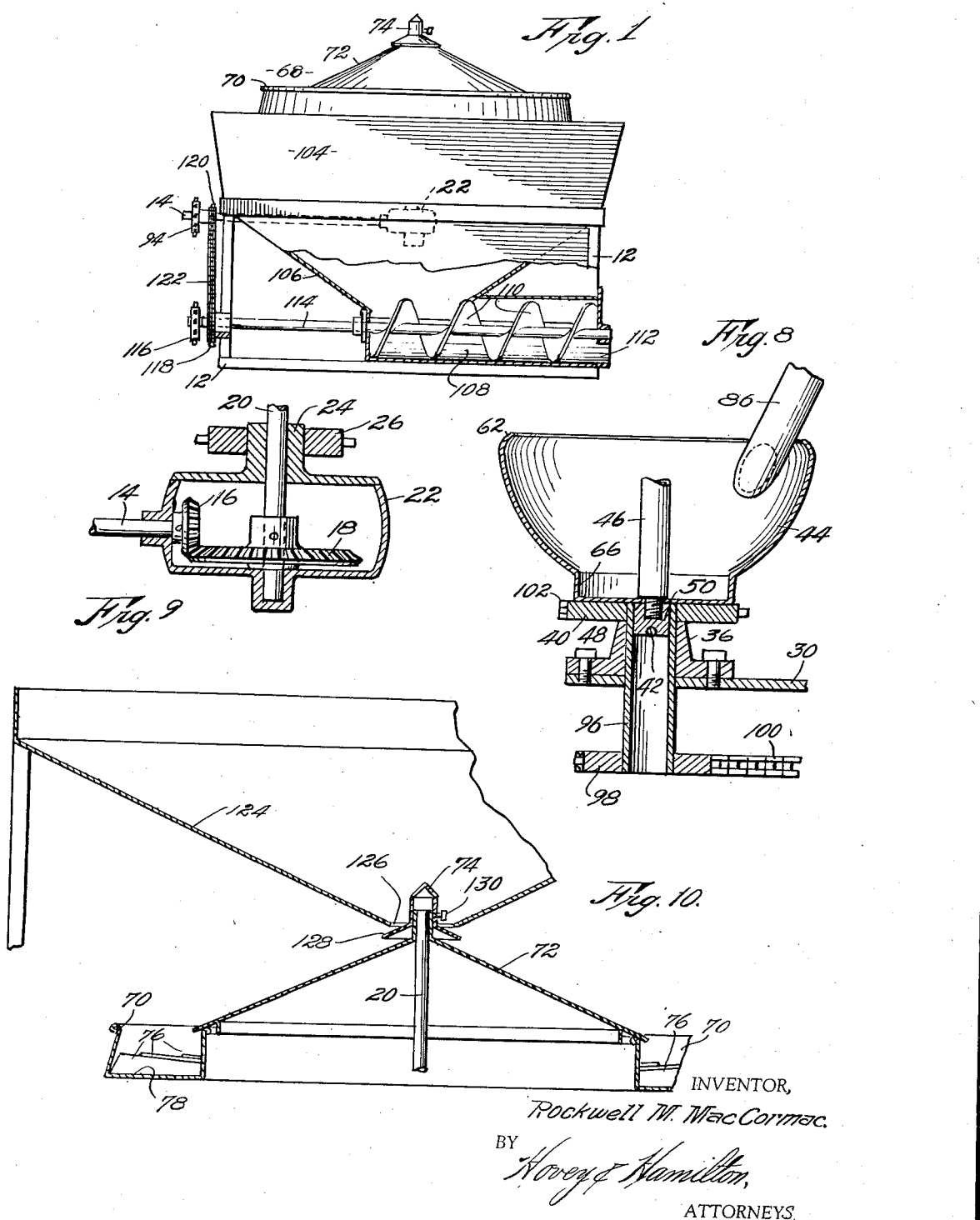

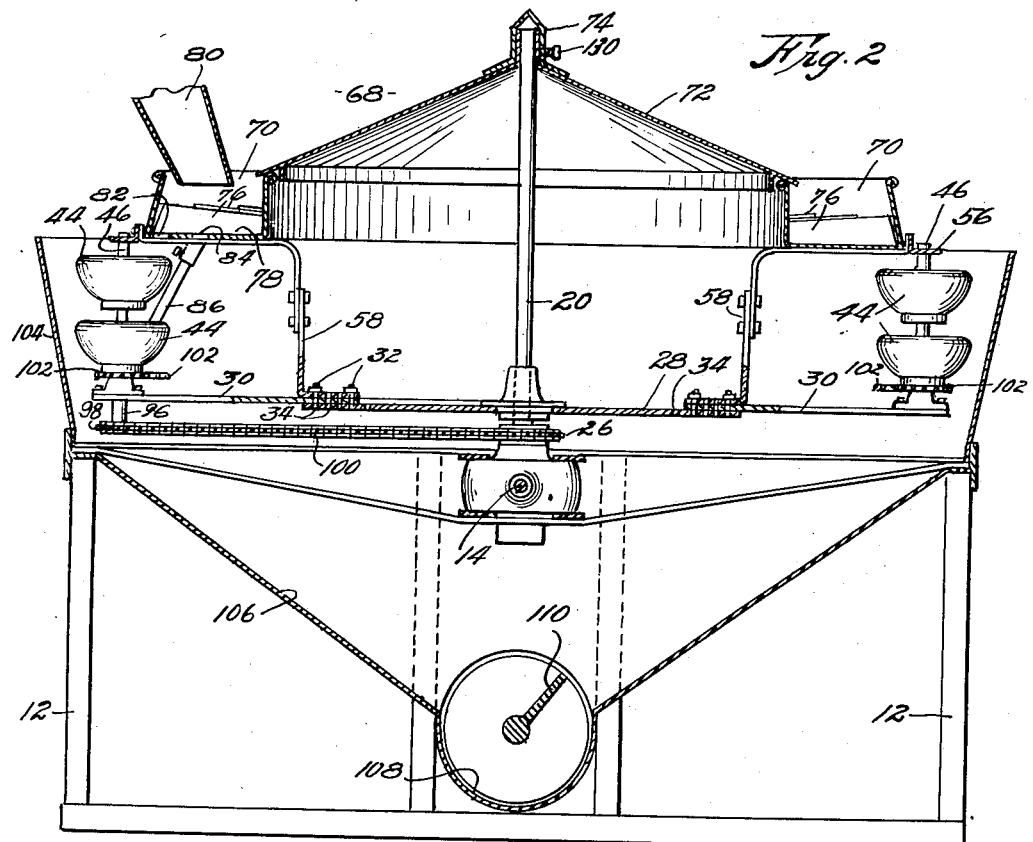

INVENTOR,
Rockwell M. MacCormac.
BY
Hovey & Hamilton
ATTORNEYS.

Patented Apr. 25, 1939

2,155,432

UNITED STATES PATENT OFFICE 2,155,432

ROTARY CONCENTRATOR

Rockwell M. MacCormac, Kansas City, Mo.

Application June 24, 1935, Serial No. 28,155

5 Claims. (Cl. 233—17)

My invention relates to those types of vertical concentrators comprising material continuous feeding apparatus and concentrating cups, and which employ a combination of rotary movements, centrifugal force and specific gravity, as the principal means of treatment and recovery of free heavy gravity material from lighter gravity material and especially minerals contained in auriferous and other mineral bearing alluvial deposits, crushed free milling ores, and the like.

A maximum recovery of mineral is dependent upon a proper adjustment and relation of the screened supply stream of mineral bearing material, the concentrating cups, the direction of rotation and the three principal natural forces employed, so that each force can assert its power in the desired manner and will be enabled to accomplish its own particular work, to cause a constant flow of mineral bearing material; a shifting, tumbling, milling and rolling of the material into and within the cups; a continuous discharge of waste or light material over the outer edges of the cups and from sub-hopper below; and retaining in the cups substantially all mineral values together with a small quantity of light or waste material.

In general types of concentrators there are no means for increasing capacity, and screened mineral bearing material feeding of the concentrator is done through a centrally positioned heavy load carrying hopper that is revolved with the concentrating cups and which has outer vertical walls or walls that slant inwardly to the bottom and has long horizontal tubes leading to the cups positioned a relatively long distance from the hopper. In such hoppers the material is allowed to find its own way into the tubes and cups without regulation, direction and equal distribution, and it also packs against the outer wall of the hopper and lodges between the tubes, which slows down the feeding operation and reduces the capacity. There also is no provision for reconcentration of concentrates, nor any means for making small lot tests from time to time. Because of these defects and the fact that these revolving hoppers and their loads are excessively heavy, and furthermore, as the long tubes get out of order, this structure is inefficient and objectionable.

In the usual common type of vertical concentrating cups of substantially half sphere, and when traveling rapidly around in a circular path and, also rotated on their own axes to cause minerals to seek the bottom and far sides of the cups, yet, when working at maximum speed and capacity, fine minute mineral particles important in volume and value but small in size and proportionately light in individual weight can be over-powered and carried out by the high centrifugal force created and friction caused by the rapid upward movement and discharge of waste material, which combined forces can exceed the power of the specific gravity of fine minerals, in which event the resulting loss of fines may be considerable, and that is a serious objection.

In vertical concentrators having cups that rotate, it is common practice to rotate all the moving parts in the same general direction, but when the cups are so rotated, this adversely affects concentration and saving of minerals, retards discharge flow from the cups and reduces working capacity; and also since such cups are necessarily removably positioned in the cup rotating means, they at times will slip, fail to rotate, or may climb, no means having been provided for anchoring them, and these defects are serious objections.

In some types of concentrators, the tables, cups and hoppers are revolved by means of a multiplicity of gears and belts, which is a complicated system, is not sufficiently flexible, and gets out of order, and furthermore, there are no ready ways and means for meeting variations in conditions which may require the changing of the position and rate of feed supply, changing direction and rate of rotation of the cups, and changing amount of centrifugal force in relation to the rate of revolution of the concentrator, and also there is no provision for gathering the tailings or for their removal.

All the above recited objections as well as others, have been overcome by the improvements I have invented.

A primary object of my invention is to provide a concentrator so designed and arranged as to materially increase capacity, and comprising one, two or more tiers of concentrating cups arranged one above another, and eliminating usual upper rotary hopper and the weight of a large mass of contents supported and carried around by the concentrator revolving table or by the central vertical shaft.

Another object is to provide a concentrator for continuous operation on a large scale, and of such design and arrangement that it can be fed by an independent hopper that does not revolve, or fed by bucket or screw elevator, or chute, or fed direct from a grizzly and revolving screen used in extensive operations.

A particular object is to provide a circular rotary distributor and parts of such character and arrangement and operation that it will require only about a cubic foot of material at all times, can be fed at any point at or within its circumference, will direct the material equally to each concentrating cup, will discharge and maintain an uninterrupted constant flow into each cup below, is adjustable so that point and direction of the delivery of material into each cup can be changed, quantity of material for the concentrating cups can be increased or decreased or stopped, all concentrates from all cups can be re-run through the distributor into one or two adjoining cups for reconcentration and final clean-up, test lots can be run into different divisions for concentration in separate cups, and the distributor can be set to feed one, two or more tiers of cups at the same time, and thus immeasurably increasing the efficiency, scope and capacity of the concentrator, and this distributor also has other advantages as well.

An important object is to revolve the concentrator table and cups and distributor in one direction around a circular path and rotate the cups on their own axes in an opposite direction, this in order to provide an improvement in the introduction of mineral bearing material into the cups, promote a better character of agitation of the material within the cups, a greater retention of mineral therein, an augmented discharge of waste material from the cups, and a large increase in working capacity.

A further object is to provide concentrating cups and parts of such improved form and arrangement as to assure rotation of each cup on its own axis, afford better recoveries of coarse and fine materials, and all so coordinated as to allow ready removal and replacement of cups, both in clean-ups and in material tests, or when worn out as result of abrasion.

Other objects include an improved form of down-spouts, adjustable arm supports for the concentrating cups and distributor, rotating drives that are adjustable, provisions for changes in direction of rotation and rate of speed, and means for gathering and disposal of waste material from the concentrator.

A still further object is to provide an improved system of power transmission for the table and cups and the distributor.

Other objects are simplicity and economy of construction, ease and efficiency of operation and adaptability to the various requirements of a machine of this character.

With these objects in view, as well as others which will appear during the course of the specification, reference will now be had to the accompanying drawings, wherein:

Figure 1 is a side elevation partly broken away, of a concentrator embodying this invention.

Fig. 2 is an enlarged, central, vertical, sectional view with certain of the parts omitted.

Fig. 3 is an enlarged, central, sectional view of the concentrating cups and associated parts taken on line 3—3 of Fig. 5.

Fig. 4 is a fragmentary, plan view of parts shown in Fig. 3.

Fig. 8 is an enlarged, fragmentary, sectional view taken on line VIII—VIII of Fig. 5.

Fig. 9 is an enlarged, fragmentary, sectional view of the transmission, and,

Fig. 10 shows a modified form of material supply and feeding device.

Figure 5:
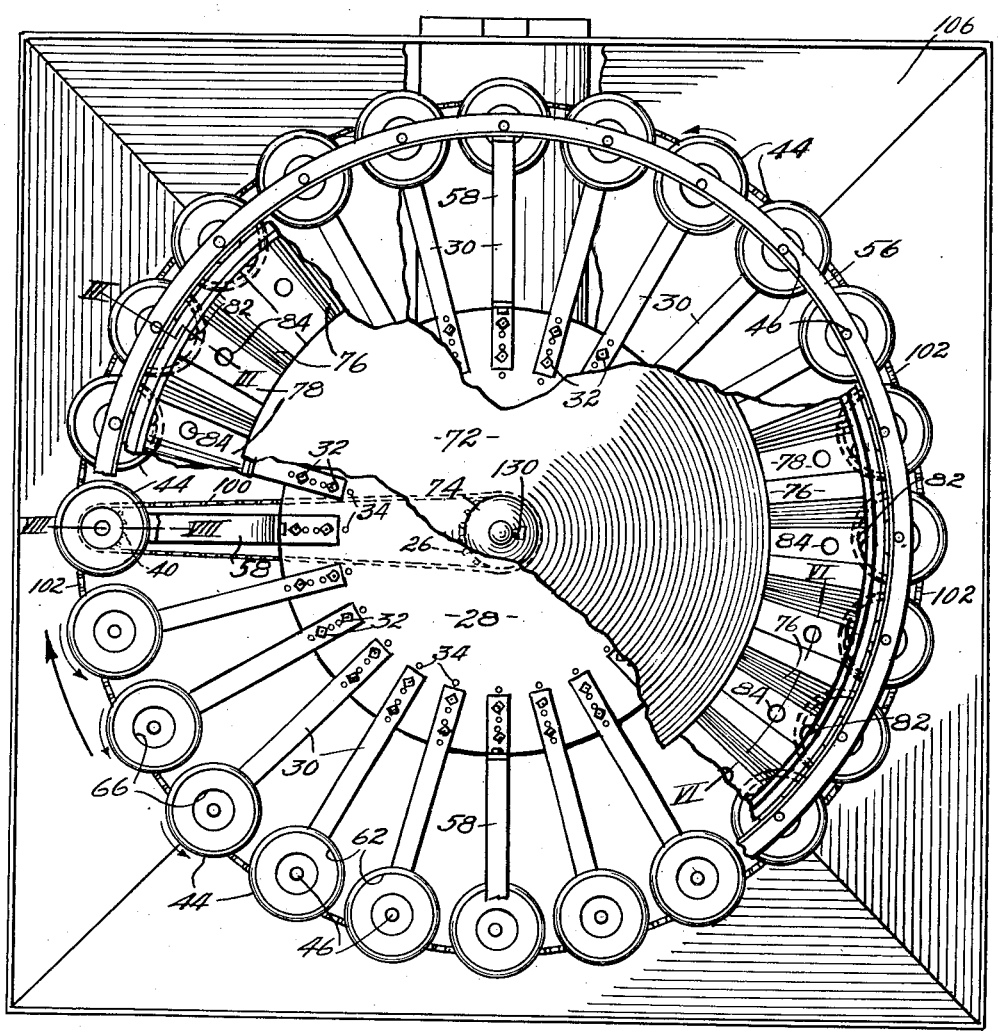
Fig. 5 is a plan view of the concentrator, partly broken away to show underlying parts.
Figure 6:
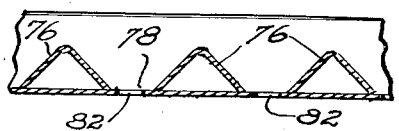
Fig. 6 is a fragmentary, sectional view taken on line VI—VI of Fig. 5.

In the drawings, the numeral 12 designates a stationary carrying frame suitable for supporting the parts hereinafter set forth. The power shaft 14 is rotatably carried by frame 12 and is provided at its inner end with a beveled gear 16 which meshes with beveled gear 18 carried by the vertical shaft 20, which is located adjacent the central portion of frame 12.

These beveled gears and shafts are suitably mounted in a casing 22 which is rigidly positioned at the upper central portion of frame 12. Any of the well known types of transmissions might be substituted for the one just described without interfering with the proper operation of the machine. The top side of casing 22 is provided with an axially disposed hub 24 which serves to carry a stationary sprocket wheel 26 in concentric relation with shaft 20.

Securely attached to shaft 20 above casing 22, is a circular table 28. Mounted on table 28, adjacent its periphery, is a series of outwardly extending, radially disposed arms 30 which are adapted to be longitudinally adjusted by means of bolts 32 and the bolt receiving openings 34 formed in table 28. Each of the arms 30 is provided with a bearing 36 which carries a sleeve 38, the upper end of which extends above 36 and is provided with a rigidly attached sprocket wheel 40. Sleeve 38, which is rotatably mounted in bearing 36, is provided with a transverse pin 42.

Concentrating cups 44 positioned in axial, vertical alignment are supported in spaced-apart relation by means of sectional posts 46 which are interconnected as shown at 48. The lower cup is secured to post 46 by means of the blind nut 50 which is provided at its lower side with a transverse slot 52 which engages pin 42 as the nut is snugly fitted into sleeve 38. The upper end of post 46 extends above the upper cup 44 and is adapted to be inserted into an opening 54 formed through an annular ring 56. This annular ring is carried by means of table 28 through the intermediacy of vertically and radially adjustable brackets 58. These brackets 58 are adjustably mounted on 28 and secured thereto by means of bolts 32. It is apparent that when arm 30 is radially adjusted it will be necessary to also similarly adjust bracket 58 in order to maintain the axis of the concentrator cups in a vertically aligned position.

As clearly shown in Fig. 5, the concentrating cups are disposed in a circle about the center shaft 20 and that it is necessary to have a radial arm 30 for each of the vertically disposed sets of concentrating cups. The number of brackets 58 may be varied at will to meet the particular requirements.

The concentrating cups may be modified in size and shape but preferably comprise a substantially semi-spherical shell 60, having an inturned lip 62 at its upper edge, while the bottom portion thereof may be offset to form a flat bottom portion 64, having a vertical, annular wall 66 extending upwardly therefrom of a diameter less than the diameter of sprocket wheel 40, thereby providing clearance for chain 102. The type of inturned lip 62 may be varied in shape since its principal function is to retard the upward movement of minerals during the operation of the device as hereinafter set forth. It is evident that the number of series of concentrating cups may be increased by simply adding other cups and posts to the vertical series shown in Fig. 3 and raising the ring 56 and the distributor hereinafter described, a greater distance from the arm 30. Also, a single horizontal series of cups might be used by eliminating the upper series, together with extension posts 46, and replacing the bottom post with a short post. When but one horizontal series of concentrating cups is used, it is not necessary to provide an upper bearing ring 56.

With the construction shown, the individual, vertical series of concentrating cups may be easily removed from the operative position by simply raising them upwardly until nut 50 is disengaged from sleeve 38, then tilting the lower end of 46 outwardly and drawing the same downwardly from opening 54 formed in 56. By reversing these movements, the cups may again be placed in the operative position.

Supported preferably on brackets 58 above cups 44, is a circular distributor 68 of such diameter as may be necessary comprising an annular trough 70 of any desired width, which extends over the inner portion of the concentrating cups 44, a conical apron 72 encircles the shaft 20, but which may be substantially horizontal if desired, and having its outer edge resting on the inner rim of trough 70; and, a specially constructed cap 74 serves to cover the upper end of shaft 20 and is vertically adjustable thereon for reasons hereinafter set forth. The outer wall of trough 70 is preferably inclined inwardly and upwardly for the purpose of maintaining the material deposited therein under proper control and to prevent its being held suspended against the outer wall because of centrifugal force created.

The relative positions of the cups and distributor are always the same whether the machine is in operation or at rest, thus making it possible to provide relatively fixed means for delivering materials from trough 70 to the concentrating cups positioned therebelow. It has been found desirable to form compartments in trough 70 corresponding with the number of vertical series of concentrating cups. This is accomplished by positioning in the bottom portion of trough 70, a series of spaced-apart, V-shaped partitions 76, thereby forming valleys 78 therebetween which serve to collect materials delivered into trough 70 through the stationary delivery tube 80 as 70 is rotated, as hereinafter described. Since the rotation of 70 is maintained at a uniform rate of speed, the holding capacity and quantity of material delivered intermittently at one time to each of the valleys 78 will be substantially the same and sufficient for a gradual feeding into each cup until the next passing of the valleys under the exterior chute for another supply. Furthermore, all materials delivered to any particular valley will be discharged into their respective cups positioned therebelow. The delivery of material from valleys 78 is through opening 82 into the top cup of the vertical series, while the material delivered to the lower cup of the series passes through opening 84, thence into delivery tube 86 which is adjustably mounted in the sleeve 88, integral with trough 70. This delivery tube may be rotated to any desired position or moved longitudinally for vertical adjustment and then secured in the desired position by means of the set screw 90. The above described structure is clearly shown in Fig. 3 of the drawings.

Figure 7:
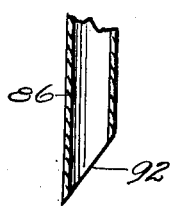
Fig. 7 is a fragmentary, sectional view taken on line VII—VII of Fig. 3.

The delivery tube 86, as clearly shown in Figs. 3 and 7, consists of a tube cut at an angle, preferably as at 92, thus producing a side delivery opening which, when properly adjusted, operates to control the flow of material into the cup and also causes its proper mixing with the material contained therein. Should more than two vertically disposed cups be utilized, other delivery tubes 86 would be provided for delivering material thereto. While the outer openings 82 are shown without any tubes, yet it is apparent that tubes of shorter lengths might be utilized where conditions required it; also, for proper distribution of materials to the series of vertical cups it might require delivery tubes or openings of varying sizes, slants and positions, dependent upon their relative distances from the center of the machine, rate of rotation, or the character of material, minerals and conditions.

Referring to Fig. 4, it will be observed that the delivery opening 82 of trough 70 is positioned forwardly of the radial line passing through the center of the machine and the cup 44, thereby producing a desirable result which will be set forth.

Special reference will now be had to Figs. 1, 2, 8 and 9 in which the driving means is shown. Power shaft 14 extends outwardly from frame 12 and is provided with sprocket wheel 94 which is adapted to be driven by any suitable power means not shown.

In Fig. 8 it will be observed that the general construction of the cup 44 and its mountings, are substantially the same as those shown in Fig. 3, with the exception that the sleeve 96 extends below arm 30 and is provided with a rigidly attached sprocket wheel 98. This sprocket wheel is in planer alignment with the stationary sprocket wheel 26 carried by casing 22 to which it is operatively joined by means of sprocket chain 100. Each of the vertical groups of concentrating cups are operatively joined together by means of sprocket chain 102 which engages each of the sprocket wheels 40 of the respective groups, thus making it possible to drive each of the cups in like direction and at the same rate of travel. This same result might be obtained by the use of a train of spur gears or by a belt drive. It is very apparent that as the turntable with its associated parts is rotated as power shaft 14 is driven, the sleeve 96 will be rotated to move the cups about their axis in a direction reversed to that of the direction of rotation of the turntable.

This particular machine as shown, is so constructed as to require that the turntable 28 be rotated in a clockwise direction while the concentrating cups are rotated on their respective axes in an anti-clockwise direction. The relative rate of rotation of these parts might easily be varied by simply changing the relative sizes of the driven sprocket wheels.

Carried by frame 12 and extending upwardly and outwardly therefrom is an apron 104 which completely surrounds the series of concentrating cups, also projecting downwardly and inwardly from the outer edges of frame 12 is a hopper 106 which terminates in a semi-circular trough 108. A helical screw conveyor 110 is positioned in trough 108 and adapted to discharge the waste materials, delivered to the trough from hopper 106, through the opening 112. Screw conveyor shaft 114 is rotatably mounted in suitable bearings and extends outwardly beyond frame 12 where it is provided with a drive sprocket wheel 116. Another sprocket wheel 118 is also rigidly mounted on shaft 114 and is in alignment with a sprocket wheel 120 mounted on power shaft 14. These two sprocket wheels are operatively connected by means of sprocket chain 122. It is apparent that as the power shaft 14 is driven, the screw shaft 114 will also be rotated to drive screw conveyor 110. Should it be more convenient to drive the entire device through sprocket wheel 116, a like action of the moving parts of the machine will be obtained.

A modified form of material supply and feeding device is shown in Fig. 10, adapted to take the place of feed tube 80 shown in the preferred form. This feeding device consists of a stationary hopper 124 having a bottom opening 126 concentric with shaft 20 and positioned above apron 72. The vertically adjustable cap 74 is provided with a frusto-conical flange 128 which extends beyond the outer periphery of the opening 126. A set screw 130 serves to securely hold cap 74 in any desired position. The amount of material delivered to apron 72 may be very definitely determined by properly adjusting the distance between stationary hopper 124 and flange 128. In this type of material feed, the weight of the bulk of material is carried by the stationary hopper 124, also the moving parts tend to agitate the material at the delivery point, thus insuring a uniform feed to the apron 72.

In the operation of this concentrator, the screened mineral bearing material flow is regulated and continuously fed in an even stream from a stationary feed tube as shown in Fig. 2, or from a stationary independently supported hopper such as shown in Fig. 10, or directly from a screening apparatus. It is apparent that material delivering means may be set to discharge at any point within the traveling distributor's circumference; however, it has been found preferable to deposit the material directly into trough 70 as shown in Fig. 2 where, under the influence of centrifugal force, it is directed, divided, and distributed in substantially equal quantities into the various valleys 78, thence to their respective associated cups.

Because of the distributor's slanted wall and the valleys formed in the trough, packing of the material at the bottom and the side walls is prevented, thus assuring equal delivery of material in the order of its entry and since such points of entry and delivery are adjacent the circumference of the distributor and above the concentrating cups, there can be no chance for interruption or variation in distribution, except that as the bottoms of the valleys are preferably flat any slowing down or stopping of the travel of the trough and cups, will decrease or stop material flow and that is desirable to avoid flooding of the cups containing the concentrates.

In order to properly understand the delivery of material to the cups and the action of the material therein, it will be considered that the observer is looking outwardly from the central supporting shaft 20. The point of delivery may be varied to suit requirements, but preferably the material flow is delivered into the cup at its right wall, and from there, the centrifugal force created by the circular travel of the cups to the right about the central axis 20 and because of the reverse rotation of the cups to the left on their own axes the material is carried forward and around past the front and to the rear where it is overpowered by the centrifugal force and shunted to the front and there it is caused to tumble and roll down and be carried under at its right and in so doing, buries the incoming material being delivered from the trough. The result of all these actions is a continuous shifting, milling, tumbling, rolling and loosening up of the material in the cups, all of which activity allows the heavy gravity mineral particles to penetrate downward toward the bottom and to the outer side of the cup, below the in-turned lip where the heavy minerals are held by centrifugal force and gravity, while the waste material of lighter gravity works its way up rapidly and spills out over the top edges of the cups at the left front quarter of the same, the constant delivery of mineral bearing material and the discharge of waste material being so regulated that the cups at all times operate at much less than their holding capacity.

It should be pointed out, that in former types of concentrators where the turntable and all cups are revolved together in one direction and the cups are rotated on their own axes in the same direction, such rotation of the cups lessens the effect of centrifugal force and the activity of material within the cups, which interfers with minerals reaching the bottoms and sides of the cups, causes losses of fine mineral particles, reduces rate of discharge flow of waste material, and restricts capacity. On the other hand, my method of rotating the cups on their own axes in an opposite direction has a beneficial effect. It supplements centrifugal force, promotes a greater and much better character of activity within the cups buries the incoming material, increases the recovery of minerals, augments the discharge of waste material, and greatly increases working capacity. Difference is such that one cup oppositely rotated can be emptied to the minimum desired, but a companion cup rotated in the same direction as the table will remain almost full and can be made to discharge only by substantially increasing the rate of revolution, at the risk of excessive centrifugal force and friction overcoming the specific gravity of small mineral particles and causing them to be cast out and lost.

When the waste material is thrown out of the cup by centrifugal force, it strikes the apron 104, slides down the hopper walls 106 to trough 108 where it is engaged and carried away by screw conveyor 110, through the discharge opening 112.

When any day's run or short time run is finished, each stack of cups may be removed as described above, the concentrates emptied therefrom, and the stack again replaced for further operation.

Concentrates thus removed may be returned to certain valleys of the distributor and re-run into one or more cups for final reconcentration, and as the quantity of concentrates is now relatively very small, the minerals may be recovered therefrom in any one of various methods available for that purpose.

Inasmuch as the compartments or valleys formed within the trough 70 communicate with the adjacent concentrating cups, it will be possible to place individual lots of mineral bearing material into predetermined individual cups for concentration and these particular cups can be marked, and thus individual lot tests can be readily made.

Due to the particular construction of this concentrator, it is apparent that the radius of the circle of concentrating cups can be readily changed to suit the particular materials being handled, also the peripheral speed due to the rotation of the turntable may be changed by simply varying the sizes of the driving sprocket wheels.

It is apparent that all the objects as set forth have been fully accomplished in the concentrator as described, but I reserve the right to make such alterations and changes as do not depart from the spirit of the invention and the appended claims.

What I claim is:

1. A concentrator comprising a stationary frame; a vertically disposed shaft rotatably carried by said frame; a horizontally disposed turntable carried by and rotatable with said shaft; a plurality of vertically disposed series of rotatably mounted vertically disposed concentrating cups having a smooth uninterrupted inner surface in the direction of travel carried by the table and arranged concentrically with said shaft and adapted to retain the heavy materials; a circular feed distributor carried by said shaft above said cups, having a trough with an outwardly and downwardly inclined outer wall and having means for delivering substantially equal quantities of material to each of said cups; means for simultaneously rotating said table in one direction and the cups about their respective axes in the opposite direction; a stationary means whereby material is delivered to said distributing means; and means for gathering the waste material thrown from the cups and delivering it to a common point.

2. A concentrator comprising series of rotatably mounted concentrating cups; a material distributing means comprising a circular shaped apron, having a trough formed at its periphery, above said cups, transverse valleys formed in said trough, a plurality of openings in the trough at the bottom of said valleys communicating with their respective cups, a centrally disposed stationary hopper positioned in spaced relation above said circular apron having a central bottom opening, a vertically adjustable feed control cap interposed between said hopper and apron to regulate the flow of material from said hopper to said apron; and means to simultaneously rotate said apron, trough and cups.

3. A concentrator comprising a rotatably mounted table; a plurality of vertically disposed concentrating and collecting cups rotatably carried by said table, each of said cups being of a hollow circular shape in horizontal cross-section with a vertically open substantially cylindrical-shaped pocket formed in the bottom thereof with side walls extending upwardly and outwardly therefrom; distributing means for delivering material to said cups; and means operable to rotate said table about its axis in one direction as the cups are rotated about their respective axes in the opposite direction.

4. A concentrator comprising a stationary frame; a vertically disposed shaft rotatably carried by said frame; a horizontally disposed turntable carried by and rotatable with said shaft; a plurality of vertically disposed series of rotatably mounted vertically disposed concentrating cups having a smooth uninterrupted inner surface in the direction of travel, carried by the table and arranged concentrically with said shaft and adapted to retain the heavy materials; a circular feed distributor carried by said shaft above said cups, having a trough with an outwardly and downwardly inclined outer wall and having means for delivering substantially equal quantities of material to each of said cups; means for simultaneously rotating said table in one direction and the cups about their respective axes in the opposite direction; and a stationary means whereby material is delivered to said distributing means.

5. A concentrator comprising a vertically disposed series of rotatably mounted concentrating cups; a material distributing means comprising a circular shaped apron, having a trough formed at its periphery, above said cups, transverse valleys formed in said trough, a plurality of openings in the trough at the bottom of said valleys communicating with their respective cups, a centrally disposed stationary hopper positioned in spaced relation above said circular apron having a central bottom opening, a vertically adjustable feed control cap interposed between said hopper and apron to regulate the flow of material from said hopper to said apron; and means to simultaneously rotate said apron, trough and cups.

ROCKWELL M. MacCORMAC.